United States Patent [19]

Käser

[11] Patent Number: 4,955,694

[45] Date of Patent: Sep. 11, 1990

[54] PROCESS FOR PRODUCING HOE'S FOR USE IN COMBINATION TO PRODUCE A TELECENTRIC BEAM

[75] Inventor: Beda Käser, Brügg, Switzerland

[73] Assignee: Zumbach Electronic AG, Orpund, Switzerland

[21] Appl. No.: 224,990

[22] Filed: Oct. 27, 1988

Related U.S. Application Data

[62] Division of Ser. No. 29,436, Mar. 23, 1987, Pat. No. 4,832,426.

[30] Foreign Application Priority Data

Apr. 3, 1986 [CH] Switzerland .................... 1299/86

[51] Int. Cl.$^5$ .................... G03H 1/04; G02B 5/32
[52] U.S. Cl. .................... 350/320; 350/3.72; 350/3.75
[58] Field of Search .................... 350/3.72, 3.75, 3.83, 350/320

[56] References Cited

U.S. PATENT DOCUMENTS

| | | | |
|---|---|---|---|
| 3,658,403 | 4/1972 | Greenaway et al. | 350/3.73 |
| 3,739,173 | 6/1973 | Broussaud | 350/3.73 |
| 3,785,736 | 1/1974 | Spitz et al. | 350/3.73 |
| 3,807,829 | 4/1974 | Close | 350/3.72 |
| 3,905,019 | 9/1975 | Aoki et al. | 350/3.73 |
| 3,951,509 | 4/1976 | Hoguchi et al. | 350/3.7 |
| 4,106,844 | 8/1978 | Bryngdahl et al. | 350/3.71 |
| 4,245,882 | 1/1981 | Chang | 350/3.72 |
| 4,505,537 | 3/1985 | Funato | 350/3.71 |
| 4,639,141 | 1/1987 | Kuwabara et al. | 350/6.8 |
| 4,701,005 | 10/1987 | Noguchi | 350/3.73 |

FOREIGN PATENT DOCUMENTS 0140594 10/1984 European Pat. Off. .
2072840 3/1981 United Kingdom .

OTHER PUBLICATIONS

Richter et al.; "Holographically Generated Lens"; Applied Optics, vol. 13, No. 12; Dec. 1974; pp. 2924–2930.
Lee; "Techniques for Recording Holographic Lenses for Infrared Wavelengths"; Optics Communications, vol. 34, No. 1; Jul. 1980; pp. 29–31.
Semenov et al.; "Holographic Lens for an Optical Correlator"; Opt. Spektrosk., 55; Nov. 1983; pp. 570–572.
Patent Abstracts of Japan, Band 8, Nr. 6 (p. 247), [1443], Jan. 12, 1984; and JP-A-58 168 907 (Anritsu Denki K.K.), May 10, 1983.
Applied Optics, Band 25, Nr. 5, 1 März 1986, Seiten 794–797, New York, US; Y. Ono et al., "Holographic Zone Plates for F.8 and Collimating Lenses".
Patent Abstracts of Japan, Band 7, Nr. 212 (p. 224), [1357], Sep. 20, 1983; and JP-A-58 106 519 (Ricoh K.K.), Jun. 24, 1983.

*Primary Examiner*—Bruce Y. Arnold
*Assistant Examiner*—Terry S. Callaghan
*Attorney, Agent, or Firm*—Spencer & Frank

[57] ABSTRACT

A light beam is repeatedly deflected in the longitudinal direction through a holographic element HOE by means of a rotating multi-faceted mirror. This HOE is so formed that the beam entering at different angles leaves the HOE as a telecentric beam. Through a further HOE the telecentric beam is diffracted onto an opto-electric transducer. In the region of the telecentric beam is located an object to be measured, and the time of the interruption of the telecentric beam by means of this object enables the dimension of the latter to be determined. The production of the telecentric beam and the deflection of the latter onto the transducer by means of the HOE allows a simple cost-effect manufacture as well as a simple evaluation of the measurements with increased precision. The manufacture of the HOE is likewise simple.

3 Claims, 5 Drawing Sheets

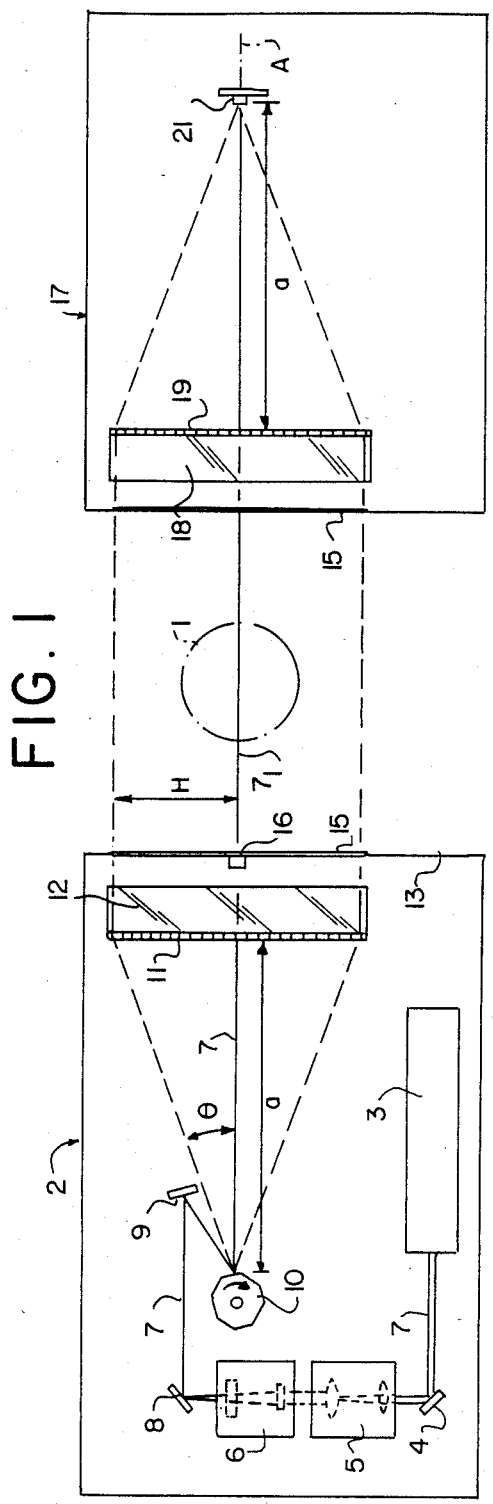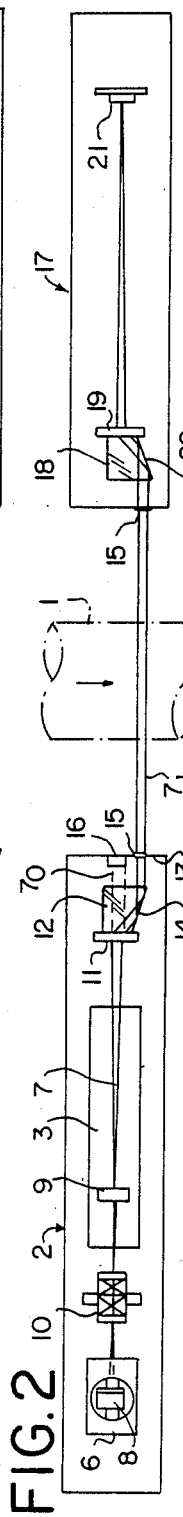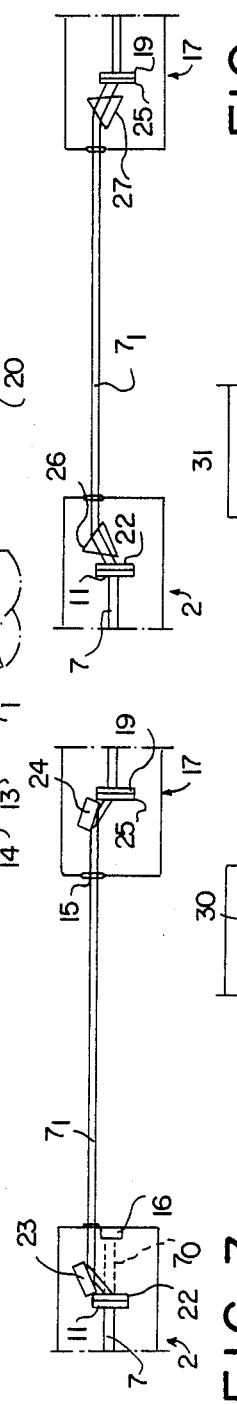

PROCESS FOR PRODUCING HOE'S FOR USE IN COMBINATION TO PRODUCE A TELECENTRIC BEAM

This is a division of application Ser. No. 07/029,436 filed Mar. 23rd, 1987 now U.S. Pat. No. 4,832,426.

BACKGROUND OF THE INVENTION

The present invention concerns a process for the production of a telecentric light beam, that is, a set of beams formed by a single beam displaced absolutely parallel to itself, especially for the measurement of the dimension and/or the position of an object in the region of the deflection stroke of the light beam, wherein the light beam is deflected through an angular range at the focal point of an optical element and is turned by means of the optical element into the telecentric direction.

Such processes are known, wherein the periodic deflection of the light beam through a defined angle is effected by means of a multi-faceted rotating mirror. The optical element for turning the light beam into the telecentric direction, as well as a further optical element for turning the telecentric light beam onto an opto-electric transducer, are formed as relatively expensive lens systems. In spite of the high cost for these lens systems it is hardly possible to achieve the shifting of the telecentric light beam linearly or exactly according to a defined function, particular an angular function. The cost of the lens systems is especially high when a larger deflection stroke of the telecentric light beam is necessary for the measurement of larger objects.

A further disadvantage of the known process for the production of telecentric light beams lies in the fact that apart from the telecentric light beam serving for the exemplified dimensional measurement no portion of the beam is available that could be used for auxiliary purposes. The extraction of such a partial beam would be complicated and expensive.

SUMMARY OF THE INVENTION

It is the object of the present invention to achieve both a simplification and reduction in the cost of the known process and a qualitative improvement therein.

The invention accordingly provides a process for the production of a telecentric light beam, wherein a light beam is deflected through an angular range at the focal point of an optical element, and is turned by means of the optical element into the telecentric direction wherein the optical element comprises at least one holographic optical element which is arranged to turn said light beam by diffraction.

The use of a holographic optical element instead of conventional optical elements has the following advantages: reduced weight; simple geometry; lower cost; larger aperture relatively to shorter focal length; and minimal lens errors with optimum reconstruction geometry and clear mathematical function between the entry angle of the light beam and its distance from a reference axis. Further advantages will be apparent from the following description.

The invention concerns also a device for carrying out the above related process including means for the deflection of the light beam at least approximately at the focal point of a system including at least one holographic optical element which is arranged to alter the geometry of the beam and/or to turn the light beam into the telecentric direction.

The invention further provides a process for the production of a holographic optical element for use in the production of a telecentric beam.

BRIEF DESCRIPTION OF THE DRAWINGS

FIG. 1 shows a front view of a device for the determination of the dimension and position of an object, FIG. 2 shows a plan view of this device, FIGS. 3 to 5 show modified embodiments of the device according to FIG. 1, FIGS. 6 and 7 serve for the explanation of the production of a holographic optical element and its operation in the production of a telecentric beam.

DESCRIPTION OF PREFERRED EMBODIMENTS

Figure 6:
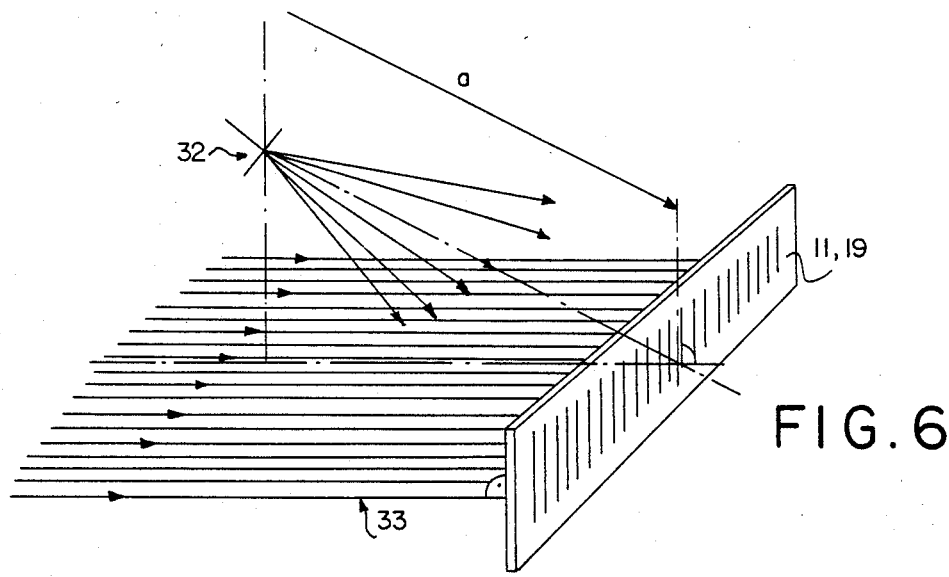

FIGS. 1 and 2 show a device for the determination of a dimension or the position of an object 1 indicated in these figures in dot and dashed lines, for example a cable or pipe issuing from an extruder. The determination of at least one dimension of such a product is of especial importance in order continuously to ascertain and to correct production errors. The measuring device comprises a transmitter part 2 which serves for the production of a telecentric light beam in the region of measurement. It is provided with a laser light source 3, which conducts a continually monochromatic light beam via a mirror 4 to a spherical expanding lens 5 from which the expanded beam enters a cylindrical expanding lens 6. By this means a flat light beam is produced, of which the plane lies parallel to the longitudinal axis of the object to be measured. This is indicated in FIGS. 1 and 2, in that the light beam 7 comprises a relatively small thickness in the region of the object 1 in the projection according to FIG. 1, but in the projection according to FIG. 2 has a certain width. This light beam 7 is projected via further deflecting mirrors 8 and 9 on to an eight sided rotatable mirror 10. During the rotation of this mirror in the clockwise direction the light beam 7 impinging thereon is deflected periodically through an angular range indicated in FIG. 1 by broken lines, from above to below. It then impinges on to a holographic optical element 11, referred to below as HOE for short. This HOE, of which the optically effective layer is very thin and is located on a thin optically transparent carrier, is coupled with a prism body 12 and thus mechanically stabilised. A certain portion of the light beam of O-order $7_o$ passes through the HOE 11 undefracted and impinges from within on to the front wall 13 of the housing of the transmitter 2. The main part of the impinging beam 7 is diffracted however and passes from the HOE as a first order beam $7_1$ at a defined angle. It is reflected at a totally reflecting or mirrored surface 14 of the prism body 12 and projected through a window 15 into the measurement region. At the position of impingement of the exiting beam of O-order $7_o$ one or more opto-electric transducers 16 may be arranged. The beam 7₁ at the opposite side of the measurement region enters through a window 15 in the housing of a receiver 17, in which is located a prism body 18 formed in a manner corresponding with that of the prism body 12 with an HOE 19 corresponding with the HOE 11. The entering light beam is, by way of the reflecting surface 20 of the prism body 18, projected on to the HOE 19 which directs the beam constantly on to an opto-electric transducer 21, for example a photocell.

During the periodic deflection of the telecentric beam about the deflection stroke bounded by the broken lines in FIG. 1, the beam reaches the transducer 21, as long as it is not masked by the object 1. From the duration of the masking and from the points in time at which the masking begins and ends, both the dimension and the position of the object 1 can be ascertained. For a deflection angle $\theta$ of the beam 7 reflected relatively to the longitudinal symmetrical axis A of the device, the distance H of the telecentric beam from this longitudinal symmetrical axis is given by $H = a \times \tan \theta$, wherein a is the distance between the position of reflection at the mirror 10 and the HOE 11. Provided that the HOE has a negligibly small thickness, is flat and at right angles to the longitudinal symmetrical axis A of the device, and provided that the angular velocity of the beam 7 reflected at the mirror 10 is constant, the deflection of the telecentric beam 7₁ is effected exactly according to a tangent function. During the evaluation of the measurement signals issuing from the transducer 21, this tangent function can thus be taken into consideration so that an exact determination of the dimension and position of the object 1 can be achieved without especial calibration of the device. If, in addition, the exact point in time of the transition of the telecentric beam through the longitudinal symmetrical axis of the device is determined by means of the optoelectric transducer 16, all measurement values can be referenced to this O-transition, at which $\tan \theta = 0$. It is thus demonstrated that the turning of the light beam through an HOE not only achieves an especial simplicity of the optical element but also, additionally, a simplicity and exactitude of the measurement.

FIGS. 3 to 5 show several variations of the optical system of the transmitter 2 and the receiver 17, wherein corresponding parts are indicated with the same reference numerals as in FIGS. 1 and 2. According to FIG. 3 the HOE 11 is arranged on a flat transparent carrier 22. The diffracted beam 7₁ is in this case turned on to a reflector 23. A reflector 24 is correspondingly arranged in the receiver 17 and the HOE 19 of the receiver 17 is arranged on a flat carrier 25.

According to FIG. 4 the HOE 11 and 19 are correspondingly arranged on flat carriers 22 and 25, and the turning of the beam is effected via refracting prisms 26 and 27.

According to FIG. 5 the HOE 11 and 19 are arranged on prism bodies 28 and 29, and the telecentric beam 7₁ is turned through refraction at the prism surfaces 30 and 31.

FIG. 6 shows one possible way of producing an HOE 11 or 19. A flat plane strip with a light-sensitive layer is illuminated with coherent light from an He-Ne-Gas-laser, from a point source of light produced by means of a space filter 32, and simultaneously with a collimated beam or a plane wave front 33 of the same laser. This illumination simultaneously with the spherical wave from the point light source and the space filter 32 and with the plane wave front 33 produces, after corresponding development of the light sensitive material, an HOE, which produces a turning of a light beam of corresponding light, as described with reference to FIGS. 1 and 2. This presupposes that the point light source 32 is located with respect to the light sensitive material in a corresponding location at the place or above the place of the subsequent deflection point on the rotating mirror 10. The distance a according to FIG. 6 should also correspond with the distance a of FIG. 1. An HOE produced in this manner has the described effect in a similar manner, to turn telecentrically the beam 7 deflected through the angle $\theta$, and also to turn this telecentric beam on to the transducer 21. It is thus to be assumed that in FIG. 1 similar HOE 11 and 19 are used, i.e. that the distance or focal length a will be the same in both cases. Naturally, differently dimensioned HOE can also be used. It is especially possible to utilise in the receiver an HOE 19 of somewhat lesser quality or with lesser focal length a since there the only requirement is that a considerable part of the light of the beam 7₁ should be projected on to the transducer 21. HOE manufactured for fixed measurements can subsequently be manufactured cheaply and simply in desired numbers through simple optical copying processes, more especially as holographic contact copies. Thus the costs in relation to conventional optical systems can be decisively lowered.

Figure 7:
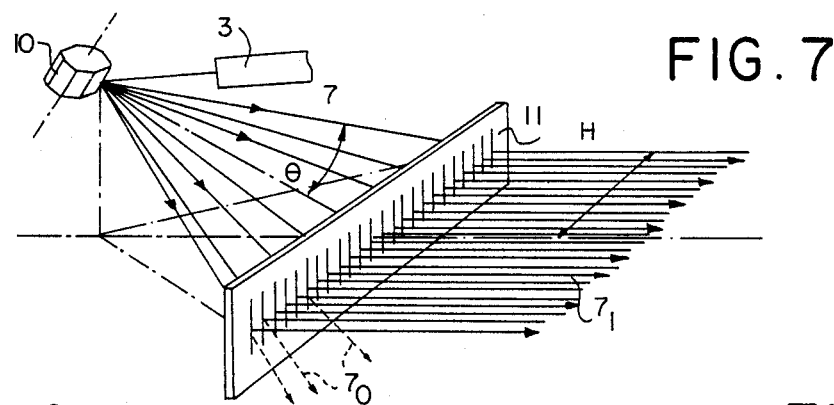

FIG. 7 shows the installation of the HOE manufactured according to FIG. 6 in a diagrammatically illustrated arrangement according to FIG. 1. Corresponding parts and dimensions are indicated with the same reference numerals as in FIG. 1. In contrast to FIG. 1, it is the case here that the beam 7 deflected by means of the rotating mirror 10 moves in a plane that lies oblique to the plane of the HOE 11, whereas the exiting telecentric 1. order beam 7₁ issues at right angles to the plane of the HOE. Such an arrangement is self-evidently also possible.

Figure 8:
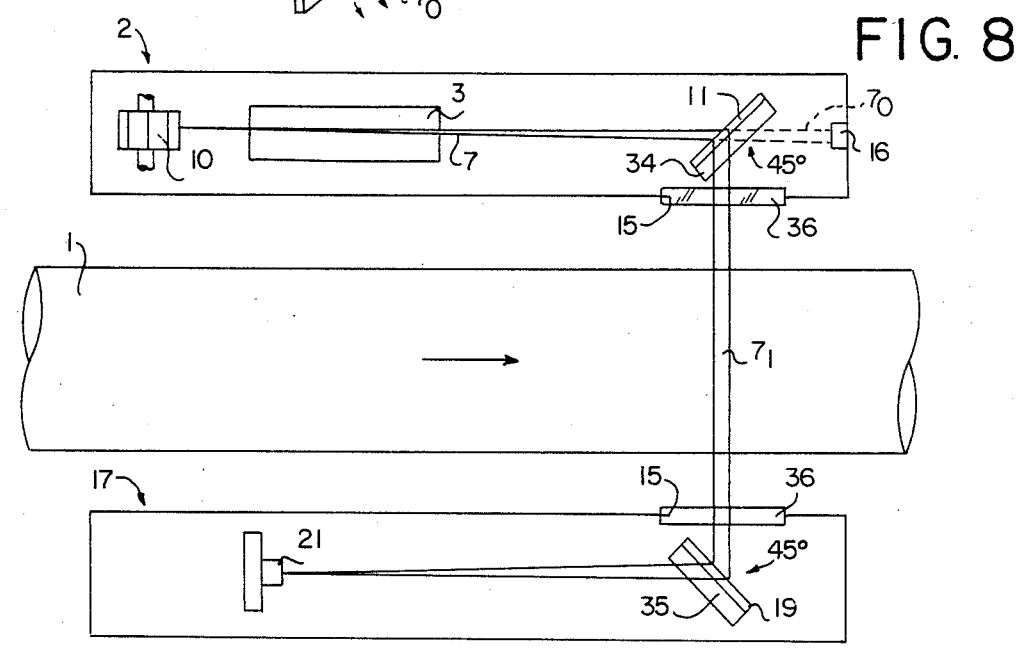
FIG. 8 shows diagrammatically a further embodiment of a measuring device.

FIG. 8 shows diagrammatically an especially favourable construct8ion of a measuring device taking advantage of the characteristics of the HOE. Corresponding parts are indicated with the same reference numerals as in FIGS. 1 and 2. The transmitter 2 and the receiver 17 are in this case arranged as flat housings on both sides of the measuring region and parallel to the direction of the path of the object 1 to be measured. The path of the beam between the laser 3, the elements 5 and 6 not illustrated, the rotating mirror 10 and the HOE, in this case lies in a plane which is parallel to the direction of the path of the object 1. The HOE 11 is arranged on a transparent carrier 34. The diffracted beam 7₁ issues from the HOE 11, inclined for example at 45°, at right angles to the direction of the path of the object 1 and to the plane of the path of the beam 7 in the transmitter 2. The HOE 19 in the receiver 17 is correspondingly arranged and located on a carrier 35. It diffracts the beam on to the transducer 21, whereby the plane of this beam again lies parallel to the direction of the path of the object 1. In this manner an especially favourable space saving arrangement of flat housing parts on both sides of the measurement region is possible. As likewise shown in FIG. 8, the exit and entry openings 15 for the telecentric beam are closed by means of windows 36.

Figure 9:
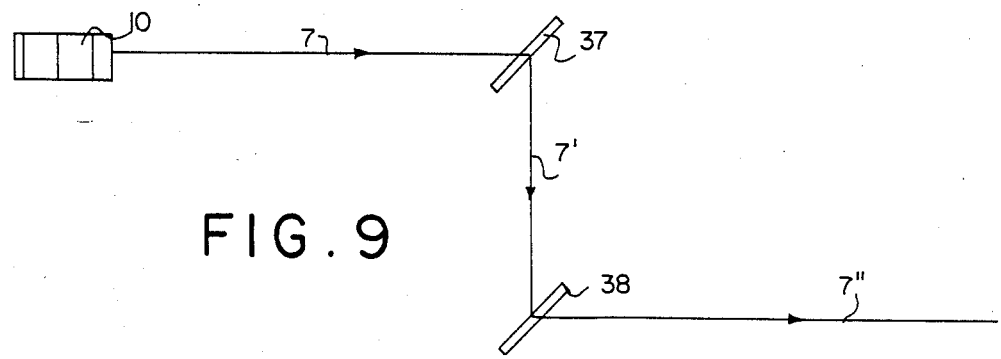
FIGS. 9 and 10 show the use of two co-operating HOE for the linearisation of the deflection of the beam.
Figure 10:
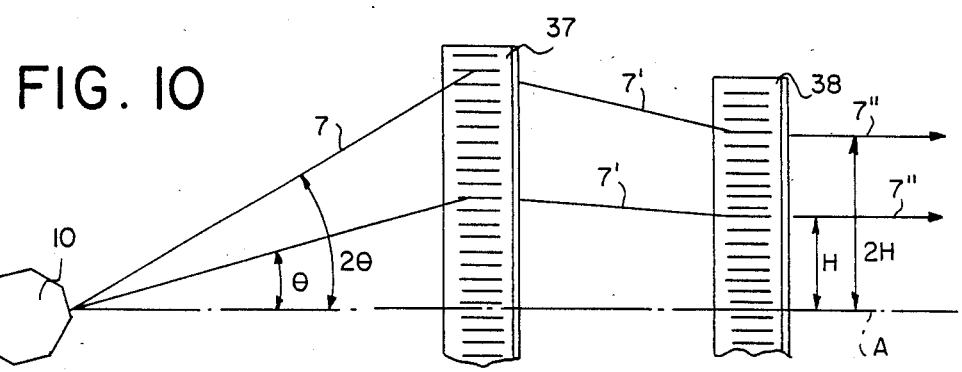

FIGS. 9 and 10 show diagrammatically an arrangement for the linearisation of the relationship between the deflection angle $\theta$ of the light beam 7 and the distance H of the telecentric beam 7″ from the longitudinal symmetrical axis A of the device. Such linearization is to create a linear relation between the distance in the telecentric beam of portions of the light originating at any two angles in the diverging beams and the difference between the angles. FIG. 10 involves a certain unwinding of the arrangement of FIG. 9 and shows only one half of the region. The light beam deflected by means of the rotating mirror impinges on a first HOE 37 which is so arranged that the diffracted beam 7' upon impingement upon a second HOE 38 is displaced from the axis of symmetry A by a distance H proportional to the angle $\theta$. This second HOE 38 is, for its part, so arranged that the impinging beam 7' is constantly diffracted in the telecentric direction parallel to the symmetrical axis A, and thus issues as the telecentric beam 7". There thus exists the relationship $H = K \times \theta$, wherein K is a constant. In FIG. 10 it is thereby indicated that the telecentric beam 7" has, at an angle of $\theta$ a distance H from the symmetrical axis A, while for an angle $2\theta$ it has a distance of 2H. This solution provides a further simplification of the evaluation of the products of measurement, in that, assuming a constant angular velocity of the beam 7 deflected by the rotating mirror 10, the telecentric beam 7" is shifted over the measurement region at a constant speed.

For the production of the two HOE's 37 and 38 the following procedure can be adopted: the HOE 37 is produced with the aid of a computer-calculation. This is thus a question of a so-called computer-generated hologram or CGH. The correspondingly produced CGH 37 is now arranged in the position indicated in FIG. 9, with reference to a point light source at the place of origin of the beam 7. At the position of the HOE 38 in FIG. 9 there is arranged a light-sensitive material which is now illuminated collectively from the point light source via the CGH and by means of a collimated beam or plane wave front in the telecentric direction. This produces an HOE which effects the prescribed refraction of the beam 7' into the desired direction of the beam 7" as described with reference to FIGS. 9 and 10.

Figure 12:
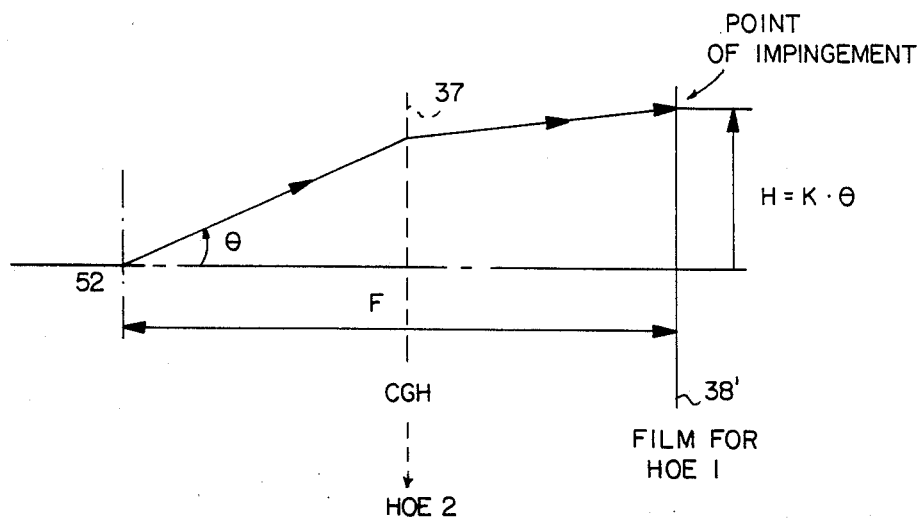
FIGS. 12 and 13 illustrate the method of producing the output HOE of the arrangement of FIGS. 9 and 10.
Figure 13:
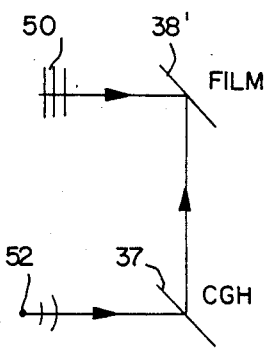

This process may be further understood with reference to FIGS. 12 and 13 which show the arrangement for production of the holographic optical element 38. A light sensitive material 38' is illuminated with two wave fronts of coherent light, including light from a point light source, and a plane wave. The plane wave 50 is arranged to run in the intended direction of the telecentric beam to be obtainable from the holographic optical element under production. The point light source 52 is disposed at a position relative to the light sensitive material 38' corresponding to the intended focal point (corresponding to the origin of the beam 7 at mirror 10 in FIG. 10) of the combination of holographic optical element 38 under production and the computer-generated hologram or holographic optical element 37. Between the point light source 52 and the light sensitive material 38' is positioned the holographic optical element or computer generated hologram 37 which defracts the radiation from the point light source 52 onto the light sensitive material 38' in such a manner that the points at which the radiation impinge on the light sensitive material 38' has a linear relationship to the angle of the radiation relative to the point light source. This relation is illustrated in FIG. 12 wherein the angle $\theta$ of the radiation as it leaves it the point source 52 has a linear relationship to the height H at the point of the impingement on the photosensitive material 38' given by $H = K \times \theta$, wherein K is a constant. In the Figure, F represents the intended focal length of the combination of the computer-generated hologram 37 and holographic optical element 38 to be produced.

The process can also be reversed, in that first the HOE 38 is produced on the basis of computer-calculation, whereupon, via this HOE, a plane wave front is projected onto light-sensitive material at the position of the HOE 37, from the telecentric direction, the light-sensitive material also being illuminated with a converging spherical wave from the location of the origin of the deflected beam 7. It would then eventually be possible to use again one of the HOE in order to produce the other HOE by holographic means, whereby an improvement of such an HOE would be possible. Such a procedure could above all be of interest since the production of a CGH of larger dimensions in sufficient sharpness or with sufficient resolving power could cause difficulties. The described improvement can be expected, since in the case of a CGH of limited resolution several undesired higher orders occur relatively strongly, which are not usable and also cannot be suppressed. The efficiency of diffraction for the 1. order correspondingly becomes worse. With the holographic reproduction of an HOE by means of the CGH the 1. order wave can be made effective almost exclusively, which leads to an HOE that for its part has essentially improved characteristics for the 1. order diffraction.

Figure 14:
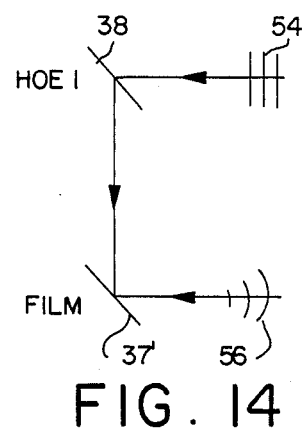
FIG. 14 illustrates a method of reproducing the computer generated hologram illustrated in FIG. 10.

The process of forming a reproduction of the computer generated hologram 37 as described above may be further understood from the following description with reference to FIG. 14. The reproduction is formed by replacing the computer generated hologram 37 in the arrangement shown in FIG. 13 described above by a light sensitive material 37'; projecting a planar wave front 54 onto the light sensitive material 37' via the holographic optical element 38 produced by the process described above, and concurrently projecting a convergent spherical wave front 56 onto the light sensitive material 37'.

Figure 11:
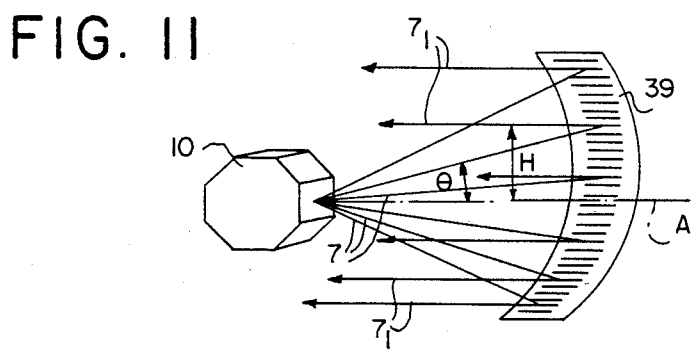
FIG. 11 shows a further embodiment with linear deflection of the telecentric beam.

FIG. 11 shows a further possibility of the linearisation of the telecentric beam, i.e. the production of a linear relationship between the deflection angle of the beam 7 and the displacement H of the telecentric beam $7_1$. According to FIG. 11 there is provided an HOE 39 curved according to a predetermined calculated curve. The curvature is so selected that for each desired deflection angle $\theta$ of the beam 7 reflected at the rotating mirror 10 the point of impingement of this beam on the optically effective layer of the HOE 39 lies at a distance H from the longitudinal symmetrical axis A which is proportional to the angle. The HOE is so constituted that the diffracted beam $7_1$ issues constantly in a parallel telecentric direction, as shown in FIG. 11.

The manufacture of the HOE 39 can be effected by means of a process wherein light sensitive material curved in the manner determined by calculation is located at the position of the HOE 39 and illuminated simultaneously by means of a point light source at the position of reflection of the beam 7 and by means of a plane wave front from the telecentric direction. Thus the desired HOE is generated.

In order to achieve optimum characteristics, certain conditions must be maintained. Apart from the fact that the geometry of the system must be maintained very exactly, it is also necessary to take care that this geometry is not altered during the process, and especially that no dimensional alteration of the HOE or CGH occurs. The latter can be achieved through air-tight sealing for the prevention of the absorption of humidity by the photographic layer. For example, a sandwich construction can be used incorporating covering glass and contact cement for matching of the refractive index between the cover glass and the photographic material. Furthermore a covering lacquer could be applied, or a direct vapour deposition with SiO or the like could be effected. In the embodiments according to FIGS. 2 and 5 a direct adhesion or sealing of the photographic carrier on to the deflection prism could be effected by means of optical cement. Care must further be taken that the conditions of polarisation are maintained in the whole system. Also, a direct application of the photographic layer on to the deflection prism could be effected.

When all these conditions are maintained a higher efficiency, that is to say a good light-gain can be obtained, and with optimal geometry minimum lens abberations can be expected. Thus it is possible to achieve a relatively large aperture and short focal length.

In many cases an ideal integration of the system is for example possible, in the sense that an HOE with its carrier can be used directly as a window. That would be possible for example in the embodiments according to FIGS. 1 and 2, where the prisms 12 and 18 could serve directly as windows at the openings 15.

As already described above, light of the same wavelength should preferably be used for the production of the HOE and in the later utilisation of the manufactures grating for the production of the telecentric beam. Correspondingly, it is naturally also possible to use the same light source for both operations, for example a Helium-Neon-Laser.

In the exemplified embodiments transmission holograms are concerned, with the exception of the reflection hologram according to FIG. 11. Any preferred hologram can be used, however, in accordance with the situation. Thus the HOE according to FIG. 11 could also be realised as a transmission hologram. In the case of the arrangement according to FIGS. 9 and 10 the two HOE could, as necessary, be realised advantageously as reflection holograms, whereby a favourable space saving transmission of the beam is possible.

I claim:

1. A method of producing a first holographic optical element from a light sensitive material, that can be combined with a second holographic optical element to direct a telecentric light beam from the first holographic optical element in a plane in a telecentric direction, by diffraction of a light beam deflected through an angular range at a focal point of the combination of the first holographic optical element and the second holographic optical element, the method comprising the steps of:

disposing a point light source, the second holographic optical element and the light sensitive material in successively spaced relation with the second holographic optical element between the point light source and the light sensitive material, the point light source and the second holographic optical element being disposed at positions relative to the light sensitive material that are the same as the respective positions, in the combination, of the intended focal point of the combination and the second holographic optical element relative to the first holographic optical element to be produced;

illuminating the second holographic optical element with coherent wavefronts of radiation from the point light source;

directing the radiation from the second holographic optical element onto the light sensitive material such that the radiation impinges on the light sensitive element at respective positions which are spaced apart by respective distances measured in the plane in a direction perpendicular to the intended telecentric direction of the telecentric beam, the distances being linearly related to angles of the radiation relative to the point light source as it leaves the point light source; and concurrently with said steps of illuminating and directing, illuminating the light sensitive material with wavefronts of coherent light from a plane wave running in the intended telecentric direction.

2. A method of producing a holographic optical element from a light sensitive material, that can be combined with a computer generated hologram to direct a telecentric light beam from the holographic optical element in a plane in a telecentric direction, by diffraction of a light beam deflected through an angular range at a focal point of the combination of the holographic optical element and a computer generated hologram, the method comprising the steps of:

disposing a point light source, the computer generated hologram and the light sensitive material in successively spaced relation with the computer generated hologram between the point light source and the light sensitive material, the point light source and the computer generated hologram being disposed at positions relative to the light sensitive material that are the same as the respective positions, in the combination, of the intended focal point of the combination and the computer generated hologram relative to the holographic optical element to be produced;

illuminating the computer generated hologram with coherent wavefronts of radiation from the point light source;

directing the radiation from the computer generated hologram onto the light sensitive material such that the radiation impinges on the light sensitive element at respective positions which are spaced apart by respective distances measured in the plane in a direction perpendicular to the intended telecentric direction of the telecentric beam, the distances being linearly related to angles of the radiation relative to the point light source as it leaves the point light source; and concurrently with said steps of illuminating and directing, illuminating the light sensitive material with wavefronts of coherent light from a plane wave running in the intended telecentric direction of the telecentric beam.

3. A method of producing first and second holographic optical elements respectively from first and second light sensitive members, that can be combined for directing a telecentric light beam in a plane in a telecentric direction, by diffraction of a light beam deflected through an angular range at a focal point of the combination of the holographic optical elements, the method comprising the steps of:

disposing a point light source, a computer generated hologram and the first light sensitive member in successively spaced relation with the computer generated hologram between the point light source and the first light sensitive member, the point light source and the computer generated hologram being disposed at positions relative to the first light sensitive member that are the same as the respective positions, in the combination to be produced, of the intended focal point of the combination and second holographic optical element to be produced relative to the first holographic optical element to be produced;

illuminating the computer generated hologram with coherent wavefronts of radiation from the point light source;

directing the radiation from the computer generated hologram onto the first light sensitive member such that the radiation impinges on the first light sensitive member at respective positions which are spaced apart by respective distances measured in the plane in a direction perpendicular to the intended telecentric direction of the telecentric beam, the distances being linearly related to angles of the radiation relative to the point light source as it leaves the point light source;

concurrently with said steps of illuminating and directing, illuminating the first light sensitive member with wavefronts of coherent light from a plane wave running in the intended telecentric direction of the telecentric beam, to obtain the first holographic optical element; and producing a reproduction of the computer generated member, the reproduction forming the second holographic optical element, said step of producing a reproduction including the steps of:

disposing a second light sensitive member between a point light source and the first holographic optical element, illuminating the first holographic optical element with wavefronts of coherent light from a plane wave, directing the radiation from the first holographic optical element onto the second light sensitive member, and concurrently with said steps of illuminating the first holographic optical element and directing the radiation, illuminating the second light sensitive member with convergent spherical wavefronts of radiation to obtain the reproduction of the computer generated hologram which forms the second holographic optical element.

* * * * *